(12) United States Patent
Nhu

(10) Patent No.: US 9,980,082 B2
(45) Date of Patent: May 22, 2018

(54) SYSTEM AND METHOD FOR TRACKING LOCATIONS AND ACTIVITIES

(71) Applicant: Kooltechs Inc., Pasadena, TX (US)

(72) Inventor: Hoang Nhu, Irvine, CA (US)

(73) Assignee: KOOLTECHS INC., Pasadena, TX (US)

( * ) Notice: Subject to any disclaimer, the term of this patent is extended or adjusted under 35 U.S.C. 154(b) by 0 days. days.

(21) Appl. No.: 15/045,104

(22) Filed: Feb. 16, 2016

(65) Prior Publication Data

US 2016/0174022 A1    Jun. 16, 2016

Related U.S. Application Data

(63) Continuation-in-part of application No. 14/836,953, filed on Aug. 26, 2015, now abandoned.

(60) Provisional application No. 62/042,011, filed on Aug. 26, 2014.

(51) Int. Cl.
  *H04W 4/00* (2018.01)
  *H04W 4/02* (2018.01)
  *H04W 84/18* (2009.01)
(52) U.S. Cl.
  CPC ........... *H04W 4/008* (2013.01); *H04W 4/005* (2013.01); *H04W 4/021* (2013.01); *H04W 84/18* (2013.01)

(58) Field of Classification Search
  None
  See application file for complete search history.

(56) References Cited

U.S. PATENT DOCUMENTS

| | | | | |
|---|---|---|---|---|
| 2006/0231109 A1* | 10/2006 | Howell | ............... | A61B 5/6887 128/898 |
| 2008/0246599 A1* | 10/2008 | Hufton | ................. | G08B 21/245 340/529 |
| 2009/0219170 A1* | 9/2009 | Clark | ......................... | G01S 5/02 340/8.1 |
| 2014/0324615 A1* | 10/2014 | Kulkarni | ............ | G06Q 30/0601 705/26.1 |
| 2015/0012761 A1* | 1/2015 | Li | ......................... | G06F 1/3209 713/310 |
| 2015/0022361 A1* | 1/2015 | Gaisser | ................ | G08B 21/245 340/573.1 |

* cited by examiner

*Primary Examiner* — Alejandro Rivero
(74) *Attorney, Agent, or Firm* — Klein, O'Neill & Singh, LLP

(57) ABSTRACT

Systems, components, and methods for tracking, monitoring, and optionally reminding for use with hospitals, businesses, and office buildings. The components of the systems can include wearable advertising devices (WAD) that emit BLE signals, repeaters and/or gateways for receiving and relaying the BLE signals over a BLE Mesh network to a remote server. IR codes can be included to detect the presence of a WAD before the WAD is energized to emit a BLE signal.

12 Claims, 5 Drawing Sheets

Figure 4: Hospital's Patient flow (or Waiting Time) data flow

Figure 5: Hand-hygiene tracking platform flowchart

SYSTEM AND METHOD FOR TRACKING LOCATIONS AND ACTIVITIES

FIELD OF ART

A hardware/software system with cloud services and related methods are disclosed that keep track of when and how long a person, tagged with a device that advertises its presence via a wireless signal, such as Bluetooth-low-energy (BLE) module emitting a beacon signal, is in the proximity of certain products, structures or services. The system and method can also track some activities (or lack of activities) of the individual while being at the location. Activities data can be uploaded to the cloud for data analysis and insightful metrics, such as check-in and check-out time at different departments in a hospital, waiting time in a queue at hospital's surgery center or trade show's exhibition booths, monitoring of hand-hygiene compliance rate in a hospital, a restaurant's kitchen, restroom, and time spent near certain store products, and waiting in line, to name a few non-limiting examples, can be gathered and analyzed.

BACKGROUND

Just about everything revolves around tracking, measuring, and analyzing metrics of some sort. It is how society, businesses, teachers, government, agencies, athletes, and employers, among others, measure baseline, performance, and productivity.

Different metrics can be measured using a host of different means, such as a stop watch, a database, video surveillance, statistical mapping and report, counting and tracking, gross receipts, balance sheets, etc. In today's high-tech world, the Internet and the cloud provide means for recording, analyzing, sharing and disseminating recorded data for use by individuals and teams to bring about change, progress, and, in some cases, maintain the status quo.

SUMMARY

Using Bluetooth signal's RSSI ("return signal strength indicator"), moving-average by a Wifi gateway to detect the proximity and identity of a person wearing a Beacon-advertising device, such as a PW or DW, or generically a WAD. The detection can be by scanning using a PCB BLE module running BLE-Mesh networking software.

For minimizing system cost and extending BLE transmission range, a BLE Mesh-repeater running mesh networking software can be used at each site (where the presence/proximity detection is desired), thus eliminating the cost of a Wifi module at each site. These repeaters, similar to the scanning BLE module in the Wifi gateway, can scan for the presence/proximity and activities, and relay their detections at their sites to a common wifi gateway for storing in the Cloud.

The system can combine BLE beacon/RSSI and IR infrared for more accurate proximity/ID detection. For sites that are too close together for scanning BLE to accurately resolve the location of the advertising Beacon device, and if those sites have walls in between them (such as patient's rooms in hospital), adding Infrared can help the system make a more accurate decision quickly. The IR transmitter in the room, which can be located somewhere at an elevated point or added to the repeater node located in the room, and the IR receiver added to the Beacon-advertising devices WAD can add to the detection capability. When the Beacon-advertising device is inside a site/room (with walls around it), its IR receiver can only "see" the line-of-sight IR from that room's IR transmitter coded with that particular room ID. The advertising device can then send advertising Beacon together with this ID, allowing only the scanning BLE in that same room to conclude, via the matching ID's in the IR code, that they are in the same room.

One or more buttons on the WADs, advertising devices such as PWs or DWs, can allow users to timestamp certain additional event by pressing on the button. This activity can be detected by the scanning BLE and reported to the cloud over Wifi. This feature can be particularly useful in a hospital's OR room to measure and log the surgery time performed on each patient by a certain doctor. At the start of the surgery, the button on the PW ("patient wearable") can be pressed. Similarly, another press on the PW's button at the end of the surgery can be interpreted as a stop event. These two events can be timestamped and logged on the Cloud server to create a report on the surgery time length for each surgeon.

Cloud services can be incorporated to receive real-time information uploaded from the one or more Wifi-gateways and can provide services such as monitoring real time location of where all the patients are at each department in the hospital, thus the patients' waiting times at these queues can be measured and the department performance efficiency can be estimated.

Similar to FedEx or UPS tracking system, the patient's real time location information can be shared over the Internet on a web browser for remote family members to access and determine at which department in the hospital the patient is currently located.

Additionally, in the OR (operating room), the press of the button on the patient's advertising device at the beginning and at the end of the surgery can be recorded in the cloud to measure the surgery time performed by the surgeon on each patient.

Similarly, instead of tagging the patient with an advertising Beacon device, hospital staff or even assets can be tagged with such Beacon device to enable tracking of the tagged device. This enables real time staff workflow management and asset tracking services in hospitals A special RTLS service (real time location system) based on the technologies of the present disclosure can help reduce "HAI", hospital-acquired infections, or enforce a restaurant's kitchen/restroom hand-washing requirements. Thus, aspects of the present disclosure includes a hand-hygiene tracking platform that can detect the ID of a caregiver who enters and exits a patient's hospital room or some space or location, such as a restroom.

The system can check to determine whether a caregiver remembers to wash his hands with soap from the room's soap dispenser bottle. This can be determined by monitoring if soap is dispensed from the bottle within a few seconds of the caregiver's arrival and departure from the patient's room. The present application can work with both existing mechanical and optical soap dispenser bottles using a mechanical switch that changes state when soap is being released to wake up the BLE module from its normal sleep mode to scan for the caregiver's ID. This scheme can optimize battery life of battery-operated optical soap bottles.

All of these events with their timestamps can be logged in the cloud and reports can be generated for review of hand-hygiene compliance rate and statistics.

The system of the present disclosure can be used in different environments than hospitals.

Aspects of the present disclosure include a tracking and monitoring system comprising: a wearable advertising device (WAD) comprising a housing having a BLE module and an IR receiver; said BLE module of said WAD having a unique WAD ID; a gateway having a BLE module and a WiFi module in an enclosure, said gateway is configured to receive said WAD ID over a BLE-Mesh network and forwarding said WAD ID using said WiFi module to a remote server.

The tracking and monitoring system can further comprise a signal capable dispenser having a BLE module, and wherein the BLE module on the signal capable dispenser can be made active only following activating a switch associated with said signal capable dispenser.

The tracking and monitoring system can further comprise a repeater, said repeater comprises a BLE module for receiving said WAD ID from said WAD and forwarding said WAD ID to said gateway for sending to the remote server.

Said signal capable dispenser can be a soap dispenser or a hand sanitizer dispenser having a mechanical hand pump actuator or an optical sensor for activating an actuator.

The tracking and monitoring system can further comprise an IR transmitter associated with said repeater, said IR transmitter can be programmed to send an IR ID to said IR receiver in said WAD.

Said WAD ID can be programmed to only transmit after said IR receiver of said WAD receives a signal from said IR transmitter of said repeater.

The tracking and monitoring system can further comprise an IR transmitter remote from the gateway, wherein said IR transmitter remote from the gateway can be configured to put said BLE module on said WAD on sleep mode.

The tracking and monitoring system wherein return signal strength indicator (RSSI) can be used to detect proximity and identity of the WAD and the gateway running a BLE-Mesh networking software. Wherein the RSSI value can comprise a moving-average.

The gateway can be a first gateway and the system can further comprise a second gateway, wherein said second gateway can comprise a BLE module and an IR module and wherein said IR module of said second gateway can be configured to relay a second gateway IR ID to said WAD to wake up the BLE module of said WAD.

The WAD can be configured to emit said WAD ID and said second gateway IR ID to said second gateway for sending to the remote server.

The tracking and monitoring system of can further comprise a button on said WAD configured for time-stamping a first event by pressing on the button.

Wherein the first event with the time-stamping can be received by the BLE module of the gateway and the first event can be reported to the remote server over WiFi.

The tracking and monitoring system, wherein the button can be configured for time-stamping a second event by pressing on the button a second time, which can be used with the first event to compute an elapsed time.

Aspects of the present disclosure further includes a method of tracking a hand wash event comprising: emitting a beacon signal comprising a dispenser combination ID comprising a unique ID associated with a wearer and a unique ID associated with a dispenser; wirelessly sending the dispenser combination ID to a remote server.

Another aspect of the present disclosure is a method of tracking movement of an individual comprising: associating a wearable advertising device (WAD) to the individual, said advertising device comprising a BLE module, an IR receiver, and a WAD ID; transmitting a signal comprising a first location ID from a first IR transmitter to the IR receiver and waking the BLE module on the WAD; transmitting a first combination ID comprising the WAD ID and the first location ID to a remote server; transmitting a signal comprising a second location ID from a second IR transmitter to the IR receiver and waking the BLE module on the WAD; and transmitting a second combination ID comprising the WAD ID and the second location ID to the remote server.

The individual to be tracked can be a patient at a hospital or a worker at a work environment.

In some examples, instead of tracking an individual, an object, such as a tool or an equipment, can be tracked.

BRIEF DESCRIPTION OF THE DRAWINGS

These and other features and advantages of the present devices, systems, and methods will become appreciated as the same become better understood with reference to the specification, claims and appended drawings wherein:

DETAILED DESCRIPTION

Figure 1A:
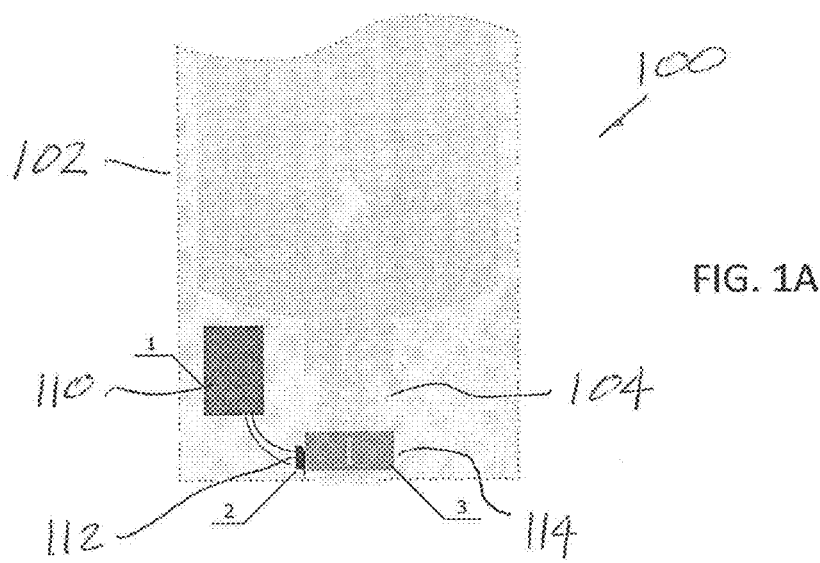
FIG. 1A shows a signal capable dispenser in accordance with aspects of the present disclosure in a pre-activated configuration.

The detailed description set forth below in connection with the appended drawings is intended as a description of the presently preferred embodiments of monitoring and tracking systems provided in accordance with aspects of the present devices, systems, and methods and is not intended to represent the only forms in which the present devices, systems, and methods may be constructed or utilized. The description sets forth the features and the steps for constructing and using the embodiments of the present devices, systems, and methods in connection with the illustrated embodiments. It is to be understood, however, that the same or equivalent functions and structures may be accomplished by different embodiments that are also intended to be encompassed within the spirit and scope of the present disclosure. As denoted elsewhere herein, like element numbers are intended to indicate like or similar elements or features.

Aspects of the present disclosure include a platform having one or more BLE advertising devices and one or more Wi-Fi/BLE enabled gateways for interacting with the BLE advertising devices, such as for capturing BLE signals advertised by the advertising devices. The gateways can be thought of as bridges that bridge between BLE advertising devices and sensors and the Cloud. Optionally, BLE Mesh-based repeaters and IR devices can also be included. The BLE Mesh-based repeaters can be used for applications in which activities in different zones or rooms are to be tracked and the proximity of the different zones or rooms allow for several repeaters, such as two or more repeaters, to be used for every one gateway. Where the rooms or zones are spaced or where an application calls for tracking discrete zones or rooms, each of the spaced rooms or zones can be equipped with a gateway without a repeater. Optionally, repeaters can also be used for applications where the rooms or zones are spaced from one another.

A discrete system, such as for use with a room or a zone, of the present disclosure can include a single Wi-Fi enabled gateway interacting with one or more BLE advertising devices, such as devices worn by multiple caregivers or multiple patients. A broader system can include multiple Wi-Fi enabled gateways interacting with a plurality of BLE advertising devices, via optional BLE Mesh-based repeaters. Optionally, infrared transmitters and receivers can be incorporated with the broader system to further enhance location tracking resolution and facilitate interactions between the system's components. An exemplary discrete system can comprise a plurality of BLE advertising devices, a BLE Mesh-monitoring module embodied in a gateway, a BLE Mesh-based repeater, and an infrared (IR) module, which can include an IR transmitter (IRTX) and an IR receiver (IRRX).

A gateway can be provided for every two or more discrete systems, such as every two to ten discrete systems, which can be every two to ten rooms, with a dedicated gateway per discrete system contemplated. For example, where a hospital is divided into different zones that are sufficiently spaced from one another, each zone can be equipped with a gateway without repeaters, although repeaters are optionally useable with the present system. Thus, a system at a facility can comprise BLE advertising devices, BLE modules, BLE Mesh repeaters, infrared (IR) modules, Wifi/BLE Mesh gateways, and a cloud server, which can be understood to be a remote server, which can be onsite but preferably offsite. The system can include other hardware and software components, as further discussed below. A BLE Mesh repeater can embody a housing having a BLE module for monitoring, also known as scanning, advertised BLE signals, such as Beacon signals, and then forwarding the received signals to a Wifi/BLE Mesh gateway to then forward to a remote server, such as a Cloud server. Data on the Cloud server can be accessed and queried by users having the requisite security or password.

In an example, a cloud server can be provided with data analytics to analyze uploaded data for display on a web-browser dashboard in real-time. The web-browser dashboard can be programmed to send notifications, such as a phone notification, a text, an electronic message, or an email, of certain triggering events, can create reports, can compute data to provide information, such as regarding the system's efficiency-vs-bottleneck/compliance statistics, or combinations thereof. The web-browser dashboard can alternatively provide basic data entries, such as names, IDs, check-in time, check-out time, surgery elapsed time, and time at certain zones or rooms, as exemplary non-limiting examples.

The Wi-Fi/BLE Mesh gateway of the present system, connected to a Wi-Fi router, can include a BLE hardware module running BLE-Mesh-networking firmware to communicate with surrounding BLE sensor devices and/or BLE Mesh repeater nodes (RP). A fuller description of a BLE-Mesh networking architecture is discussed further below with reference to FIG. 6 and can be found in application Ser. No. 14/836,955, filed Aug. 26, 2015 and in co-pending application entitled A SMART HOME PLATFORM WITH DATA ANALYTICS FOR MONITORING AND RELATED METHODS, filed Feb. 16, 2016, the contents of each of which are expressly incorporated herein by reference as if set forth in full.

Depending on the applications for the present systems and methods, BLE sensor devices being monitored can comprise one or more PW devices and one or more DW devices. A PW device is an abbreviation for a "patient wearable" device that has BLE electronics and the device can advertise the patient/visitor's ID, which can be a Beacon-advertising device. A DW device is an abbreviation for a "doctor wearable" device that has BLE electronics and the device can advertise the doctor/caregiver's ID, which can also be a Beacon-advertising device. The PW device and the DW device can also each be equipped with an IR receiver, as further discussed below.

Although termed "PW" and "DW", the labels can apply to other wearers and the "PW" and "DW" devices can be worn by other wearers outside of a hospital setting, such as in a restaurant, in an office environment, at a sport complex, or at a supermarket. Thus, the terms PW Device and DW Device are understood to designate devices that can be worn by two different categories of wearers that can separately be tracked by the system's Wi-Fi/BLE mesh gateways and are not limited to a particular environment, such as being limited to a hospital environment. More broadly, the PW and DW devices can be called wearable advertising devices (WADs) and the different types of WADs can be called a first WAD, a second WAD, a third WAD, etc. to designate devices for two or more different categories or types of wearers. In other examples, there can be fourth, fifth, and other multiple numbers of categories of WADs. Thus, the terms PW devices and DW devices can more broadly designate other wearers of the wearable devices and can generically be referred to as WADs. The WADs can be worn by a chef or a waitress at a restaurant, workers at a sport complex, workers at an airport, workers in an office building, workers at a gym, students and teachers at a school, attendees at a conference, and for placement on assets, such as equipment, tools, etc.

An exemplary application of the present system can be used for tracking a wearer's presence at or near certain tagged consumer merchandise. For example, a gateway can be placed near a high-end handbag section at a department store to track the presence of shoppers wearing the wearable advertising devices. The length of time a consumer spends at the high-end handbag section and the number of visitors that visit the section can be tracked to allow management to analyze and evaluate product placement, sale prices, product types, etc.

Another application of the present system is placement of one or more WADs on one or more tools or equipment to be tracked. For example, if a hospital has four dialysis machines, by placing a WAD with a unique ID on each of the dialysis machine, the machines can be tracked as they move near a BLE mesh-based repeater or a gateway.

The different WADs have different electronic identifications so that when worn by a certain category of workers, people, or providers, the system can distinguish and track them using different metrics. In an example, each WAD is programmed with a unique code, such as a binary or digital code, and the wearer is matched with the unique code so that when the unique code is detected, the wearer's name can be associated with the tracked code. Thus, the PW device and DW device are both Beacon advertising devices but wherein they advertise different information, such as different unique IDs.

In an example, WADs can each be about the size of a coin, such as a nickel or a little larger, like a quarter, and can be understood as coin-cell-battery-powered wearables that can be worn like a clip-on badge or a wristband and can optionally include one or more functional buttons for user input/signaling or otherwise provide additional functions or capabilities, such as to provide add-on capabilities or to turn a timer on/off, etc. In other examples, the WADs can embody different shapes, such as an elongated keyfob, a round keyfob, etc. The WADs are optionally configured to be worn on an exposed exterior of the wearer's clothing so that the IR receiver, if equipped, can "see" signals from an IR transmitter, as further discussed below. Alternatively, the WADs can be worn in a pocket or placed inside a purse.

The system can include signal capable bottles or dispensers. A signal capable device can mean a device that can scan for electronic message or signal from another device, can advertise (broadcast or emit) its own electronic message or signal, or both. In an example, a dispenser or a bottle can contain soap or an alcohol-based liquid, such as a soap bottle or a soap dispenser, used as a hand sanitizer. The soap bottle or dispenser can be an off-the-self commercially available product. The soap bottle or dispenser can be retrofitted with a BLE module that can scan and advertise to become a BLE signal capable bottle or dispenser. Thus, another exemplary discrete system can comprise two different BLE-based devices, such as a wearable BLE device and a BLE signal capable device having a BLE module mounted or placed somewhere within a room, as further discussed below. The dispenser can be a wall mounted type or a table top type. The dispenser can also be a hand sanitizer that can disinfect without washing.

Figure 1B:
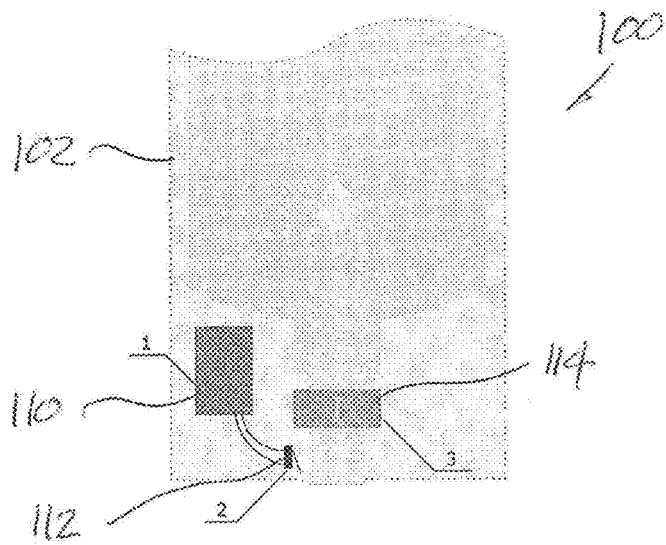
FIG. 1B shows the signal capable dispenser of FIG. 1A in an activated configuration.

With reference now to FIGS. 1A and 1B, an exemplary bottle or dispenser is shown 100, which comprises a housing 102 and a nozzle 104. The housing 102 can embody a combination external rigid frame and an internal refillable or replaceable bag or a single integral unit with a cavity for storing contents, such as soap or other cleaning agents. The housing 102 can include other structural features for dispensing the contents within the housing, such as a valve, a lever, a releasable panel for refilling/changing, or other activating means for releasing the contents inside the housing. The nozzle 104 can represent a path or channel that the contents travel when the dispenser 100 is activated. The nozzle 104 is understood to be in fluid communication with the cavity of the housing 102.

With specific reference to FIG. 1A, a BLE module 110 is shown wired to a mechanical switch 112, which is operatively coupled to a release mechanism 114. In an example, the release mechanism 114 can represent a valve, a lever, or other activating means for dispensing the contents inside the housing 102. The release mechanism 114 can be moved manually, such as pushed or pulled by a user, or automatically when activated by an optical sensor to move between a closed position to a dispensing position and then back. The mechanical switch 112, which can be a normally open switch, can be coupled to the release mechanism 114 so that when the release mechanism is activated, it causes the mechanical switch 114 to close, thus shorting a (normally open) input pin of the BLE module to ground. In this way, the BLE module of the dispenser can wake up, or be electrically energized, when the dispenser is activated to dispense. In another example, the BLE module is electronically connected to the circuit that drives the release mechanism 114, and the separate mechanical switch 112 is omitted. For example, when the optical sensor detects a hand and activates a piston or rod to dispense, the same electronic signal that drives the dispenser's release mechanism can be used to wake up the BLE module to start scanning for the nearby caregiver's WAD ID.

FIG. 1B shows the dispenser 100 of FIG. 1A but with the release mechanism 114 activated, which causes the mechanical switch 112 to close. Once the mechanical switch 112 closes, it shorts an input pin of the BLE module to wake it up and for the BLE circuit on the dispenser to start the scanning for the IDs of nearby Beacon-advertising DWs or PWs and then sending any detected ID along with the dispensers own ID to a nearby repeater or gateway. This then starts other sequence of events, as further discussed below. After a quantity of the contents inside the housing is dispensed, the release mechanism 114 is allowed to return to its closed position, which causes the mechanical switch 112 to open to cause the input pin of the BLE module 110 to return to its normal state, which shuts off the BLE circuit in the BLE module and stops the Beaconing process and then goes to sleep after a time-out period.

The signal capable bottle or dispenser 100 can be configured to scan for the arrival and ID of a caregiver from his DW device or the arrival and ID of any wearer with a WAD that comes within a detectable range of the BLE module. The dispenser 100 can also emit a signal to confirm that its contents has been released or used, such as when a release mechanism on the dispenser is activated. The dispenser 100 can also track the time interval of the wearer of the WAD upon arriving into the room and the time the signal capable bottle or dispenser 100 in the room is activated.

In other examples, as discussed further below, an IR transmitter can be used to initiate the WAD upon the WAD moving into a location or zone. The WAD can incorporate both an IR receiver and a BLE module with BLE beacon advertising capability for advertising or emitting a unique beacon ID. In an example, the BLE module on the WAD cannot scan/detect nearby beacon signals like a repeater or the BLE module on the dispenser. Optionally, the BLE module on the WAD can be equipped and programmed for scanning/detection of nearby beacon signals.

The IR transmitter, IRTX, can be housed inside a BLE Mesh-based repeater plugged into an AC-outlet located in the room with the signal capable dispenser. The IRTX can be programmed with the room or location ID that the transmitter is located in and can emit the room ID to be detected by the IR receiver on the WAD. Upon receipt of the room ID in the IRTX signal by the IR receiver on the WAD, the circuit on the WAD can then turn on the BLE circuit inside the WAD to initiate the Beacon advertising signal containing the WAD's ID and the room or location ID. The room ID being received by the IR receiver in the WAD from the IRTX in the repeater. The emitted Beacon advertising signal from the WAD is then detected by a BLE mesh repeater located nearby, such as inside the same room.

The repeater, which now has information about the WAD ID and the room or location ID and after waiting for the dispenser to respond to the WAD wearer's activation, then communicates with a nearby gateway. The communication between the BLE mesh based repeater and the gateway can be via BLE and the collected data by the gateway can be transmitted to the cloud server via Wi-Fi. The information collected and sent can include wearer's ID programmed inside the WAD, the room ID, and the dispenser ID, once the dispenser has activated. Thus, the system is understood to be capable of detecting the presence of an individual wearing a WAD upon entering a room and associate a room number, such a unique digital ID linked to the room, with the ID of the WAD. The information can also be time-stamped to track the entry time of the individual into the room.

Once the caregiver or wearer washes his/her hands thereby activating the signal capable bottle 100, the BLE module of the bottle wakes up to perform additional functions, as summarized above and further discussed below. For example, when activated, the signal capable bottle 100 can combine its ID, the detected wearer's ID, and the room ID to the gateway for data collection. The gateway can transfer the collected information to a remote cloud server for further processing and reporting. The information sent by the dispenser to the repeater, which includes the WAD ID, the room or location ID, and the dispenser ID, then to the gateway on onward to the cloud server can also include the number of dispenses since the last refill or last reset. The total number of dispenses can be used by the cloud server to estimate when the dispenser may need another refill.

The bottle 100 can also track the time between activation of the signal capable bottle and the loss of BLE signal, which can be a total loss of signal or some reduced signal strength, and can be interpreted by the dispenser to mean that the caregiver or wearer of the WAD has exited the patient's room, or the restaurant's restroom, or from some location where the dispenser is located/mounted. This activity can be monitored to determine whether the caregiver or BLE device wearer has complied with hand-washing requirements or guidelines of the hospital, restaurant, or other establishments. For example, when a waiter leaves a restroom at a restaurant, the system can determine whether the particular waiter, by detecting the particular ID of the BLE device on the WAD worn by the waiter, has caused the signal capable bottle to activate. Similarly, but with even stricter compliance rules, in a patient's room in a hospital, the system can detect whether a particular caregiver has activated the dispenser both upon entering the room and exiting the room. This helps prevent the spread of infectious diseases from the patient in the room. Lack of activity or signal from a signal capable bottle (e.g., a worker or a caregiver forgets to wash his hands with soap) within a time interval from entering (presence) and exiting (disappearance) events, which duration can be set or programmed, can result in an alarm or reminder. For example, a local alarm can activate to remind the worker or caregiver before he leaves the vicinity, a signal can be sent to a smart device, such as a smart phone, to remind the worker, or the signal capable dispenser or repeater can sound an audible alarm, etc.

The present platform can support both existing mechanical (i.e., user must press on a lever to dispense the soap) and optical (i.e., soap is released when the bottle's optical sensor detects the person's hand in its light path) soap bottles by incorporating a mechanical switch 112 to an existing bottle 100 that changes its state when the soap-release-mechanism 114 is activated. Where a dispenser has a built-in release mechanism that can be electronically activated, such as with an optical sensor based dispenser, the mechanical switch can be omitted and the built-in release mechanism can be piggyback to activate the BLE module.

The state change of the switch 112 can be detected via an input pin of the BLE module 110 in the bottle 100 to start scanning for the ID of the WAD's wearer, as further discussed below. Similar to the battery-efficient WAD that only wakes up and starts its ID via Beacon after it has received a room ID from the repeater's IRTX signal, this scheme of waiting to be energized optimizes battery life of the battery-operated optical soap dispenser bottle as the BLE module can be selected to activate only when necessary and goes back to sleep mode when idling. Alternatively, the BLE module 110 can be hard wired to a continuous power source instead of a battery operated BLE circuit so that the BLE circuit is always on to scan and detect even when the release mechanism 114 is not activated.

In some example, a retrofit housing is provided for use with a table top type dispenser. The retrofit housing can have a cavity for receiving a table top type dispenser, such as a hand sanitizer or a soap dispenser. The retrofit housing has a mechanical switch that is coupled to the hand pump portion of the table top type dispenser so that when the hand pump is activated, the mechanical switch closes to energize a BLE module located with the retrofit housing. Alternatively, the retrofit housing can be equipped with an optical sensor located near the location of the hand pump of the dispenser. When a user goes to activate the hand pump, the sensor detects the hand and activates the BLE module to scan the WAD ID and then emit a signal to the repeater to then send to a gateway. Thus, the BLE module in the retrofit housing can be programmed to operate as discussed above with reference to the BLE module 110 of FIGS. 1A and 1B.

Based on BLE RSSI (Received Signal Strength Indicator) moving-average software algorithm in the receiver of the scanning BLE repeater, when the repeater and the WAD are within about 3-5 m of each other, the BLE beacon signal strength broadcast by the advertising WAD can be high enough to allow the repeater to accurately determine the presence/proximity of the WAD, or other advertising devices emitting BLE Beacon signals. However, in certain situations, additional verification or redundancy may be preferred or can be added to the system to more accurately determine the presence and the ID of the WAD that emits BLE beacon signal. This is particularly true when the system has to be able to correctly detect which zone the WAD's wearer is located among multiple zones that are in close proximity with one another that BLE RSSI processing alone may not have enough resolution to resolve. Thus, aspects of the present disclosure can optionally include an infrared (IR) module that includes IRRX (Infrared Receiver) and IRTX (Infrared Transmitter) devices. In an example, an IRRX can be included with a WAD, such as part of the circuits of the WAD, and an IRTX can be included with a repeater, such as part of the circuits of the repeater. The repeater can be located in the same room as the signal capable bottle, as further discussed below.

From experimental data collected at a given distance between a BLE transmitter and a receiver (such as in a WAD device and a Repeater, respectively), a programmable RSSI signal strength threshold value can be selected for a given distance. For example, a 5 meter distance or some incremental distance thereof between a repeater and a WAD will produce a threshold signal that can then be used to set the outer bounds or range between the devices to still detect and transact. When a BLE WAD device comes within range of a repeater, RSSI moving average (MA) value can be used to compare against this threshold to determine when to decide that the WAD's wearer has entered the room with the repeater. If the decision based on this moving average data is that the transmitter and the receiver are within range, an IN RANGE notice or signal can be recorded and can be used to initiate additional functions or steps, such as to initiate a timer to determine when the dispense mechanism on a soap dispenser has activated.

In some examples, the steps for arriving at a decision on whether the devices are in range or not in range include a calculation step to arrive at a moving average for several RSSI values and then comparing the moving average against the threshold. For example, eight (8) RSSI values on a moving scale can be used to compute a moving average and the average compared to the threshold value. If this moving average is larger than the threshold value, a FLAG is set to 1 else the FLAG is set to 2. The process can then go to next step.

If a number (such as 8) of consecutive FLAG values are all 1's, then the result can be taken as IN RANGE. If the number (such as 8) of consecutive FLAG values are all 2's, then the result can be taken as OUT RANGE. If neither of these is true, then the calculation continues without any decision made, such as without assigning any value. In an example, the moving average can be obtained from 8 consecutive readings on a moving scale. In other examples, the number of consecutive readings can be less than 8 or greater than 8, such as 4, 6, 10, or 12.

While the RSSI moving average can stabilize the BLE signal and the IN/OUT-RANGE decision can be sufficiently accurate and/or adequate at close range, outside the 6 meter range, more moving-average computations can be incorporated to stabilize potentially fluctuating RSSI readings. However, using additional moving average computations can prolong the system response time in reaching a decision on whether a DW or other WAD is considered in proximity of the Mesh repeater. Moreover, if the system is allowed to receive a BLE signal from a WAD from too great of a distance, then repeaters from an adjacent room, office, or restaurant's restrooms, as examples, might pick up the WAD's ID of the wearer in another room. This can cause the adjacent room's repeater to incorrectly think that the wearer of the BLE device is in its room or vice versa, that the repeater in the present room will pick up a BLE signal from an adjacent room.

To remedy potential issues for misreading signals, systems and methods of the present disclosure can further include infrared (IR) modules (which transmits using line-of-sight for its reception) in the WADs or DW/PW devices and Mesh-repeaters. For example, sites that are too close together for scanning BLE signals to accurately and quickly determine the location of the advertising Beacon device, and/or if those sites are within proximity of nearby systems, adding Infrared capability can help each discrete system make a more accurate and quick decision regarding the presence of a WAD while minimizing signal leakage from nearby rooms. An IR transmitter can be added to a repeater node and an IR receiver can be added to a Beacon-tagging device, such as a WAD. When a WAD is inside a site/room, its IR receiver can only "see" the line-of-sight of an IR signal from that room's IR transmitter coded with that particular room or location ID. Once this reading is confirmed by the WAD's IR receiver, the BLE module of the WAD, such as PW or DW device, will activate to send an advertising Beacon signal together with the ID obtained from the IR transmitter to the repeater located in the same room, thus allowing only the scanning BLE in that same room, such as the repeater in that room, to conclude, via the matched ID's in the IR code, that they are in the same room. This concept is further discussed below.

Figure 2:
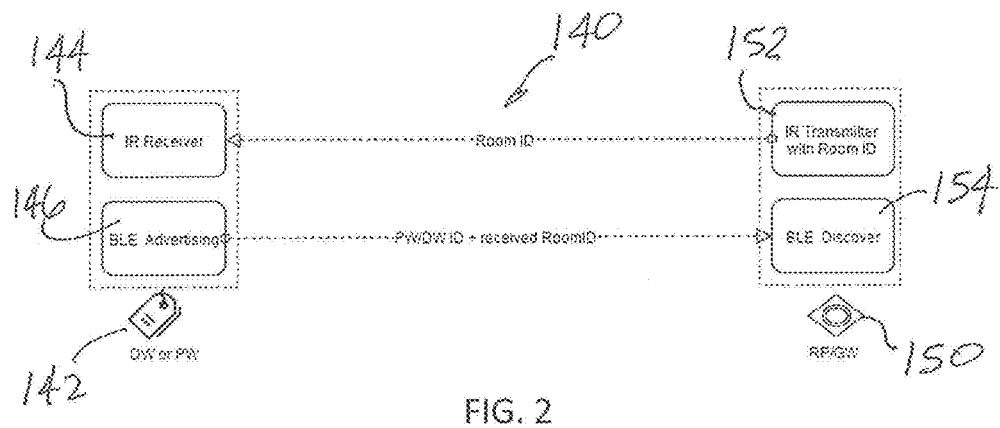
FIG. 2 is a schematic diagram showing a system for detecting and monitoring a wearable advertising device (WAD) using a repeater and/or a gateway.

With reference now to FIG. 2, a schematic diagram depicting a discrete system is shown, which is generally designated as 140. The discrete system 140, which can be a room or other designated enclosures or zones, comprises a wearable advertising device (WAD) 142, which can be a DW device or a PW device, and a repeater RP 150. The repeater 150 can embody a standalone box or a housing having two or more distinct circuitries or modules: an IR transmitter 152 programmed to transmit a unique ID associated to a particular room or location and a BLE discover module 154 to receive BLE signal from the WAD, the dispenser, or other BLE devices. The BLE module 154 of the repeater can also broadcast to relay its messages to other repeaters or to a gateway. In a particular example, the BLE module 154 on the repeater is considered a BLE discover module to describe its function to scan for BLE signals. In a particular example, the repeater 150 is continually powered and its IR transmitter is configured to transmit the room or location ID to be detected by an IR receiver on the WAD. The BLE discover module 154 in the repeater is programmed to scan for Beacon signals transmitted by the WAD 142 and wherein the signal includes the ID associated with the WAD and the room or location ID transmitted by the repeater's IRTX and picked up by the IRRX in the WAD. The combination of both IDs may be referred to as a Combination ID, which includes the WAD ID and the location ID received by the IR receiver.

The WAD 142 can embody a badge having a compact shape and size. In an example, the WAD 142 resembles a coin-cell-battery-powered wearable device but can embody other shapes and sizes. The WAD 142 contains two or more distinct modules: an IR receiver 144 and a BLE advertising module 146. The IR receiver 144 is configured to receive IR signal from the repeater 150, couple the information read by the IR receiver with the ID of the wearer, as programmed into the WAD 142, to produce a Combination ID, which is understood to include both the ID associated with a location and the ID associate with the WAD and worn by a wearer. The WAD 142 then advertises the Combination ID via a Beacon signal that is discoverable by the BLE discover module 154 of the repeater 150. This information received by the repeater 150 can then be sent to a gateway and the gateway can communicate to a cloud server to initiate other processes, as further discussed below. The communication to the Cloud server can be via Wifi through a Wifi router. The gateway can be remote from the repeater 150, such as being spaced, outside or away from the room or location of the repeater. The gateway can receive and process signals from two or more repeaters, such as 3 or more, for example 10 to 40 repeaters. The actual maximum number of repeaters usable with a gateway can depend on the distance between two (2) adjacent repeaters and the tolerable system latency or responsiveness.

The structure and function representing the repeater 150 in the system of FIG. 2 can also represent a gateway, as further discussed below with reference to gateway 210 of FIG. 3. In practice, as further discussed below, the repeater 150 and the gateway 210 can represent two separate components of the tracking and monitoring of the present disclosure. Both the repeater 150 and the gateway 210 are configured to relay BLE signals. For example, the repeater 150 is configured and programmed to relay information received from one or more WADs 142 and then relay to the gateway 210. The gateway 210 is configured and programmed to relay information received from one or more repeaters 150 to a Cloud server 220. In yet other examples, the repeaters are omitted from the system and the WADs interact directly with one or more gateways 210 which then relay to the Cloud server.

Figure 3:
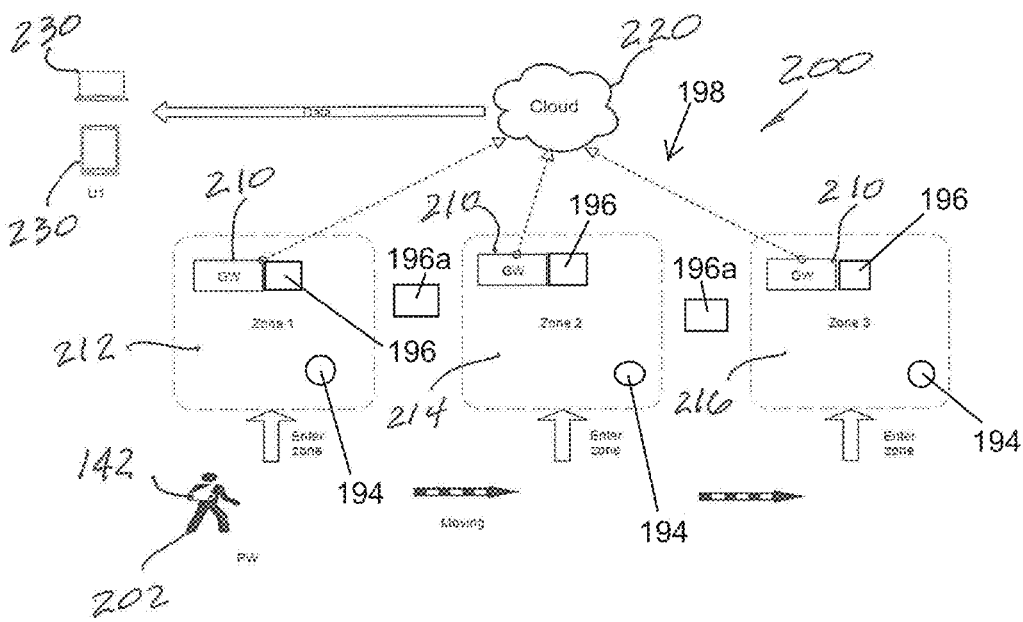
FIG. 3 is a diagram depicting a tracking system that monitors a person wearing a WAD as the person and the WAD crosses different zones of a facility.

With reference now to FIG. 3, a system architecture of a hospital patient flow monitoring platform is shown, which is generally designated 200. The system 200 is useable to track a wearer of a WAD making his way through a facility. For example, during a hospital visit, a patient may first check into a reception area, then move to an X-ray area, then to an MRI area, then to an operating room, and then finally to a recovery room. The system 200 and its components can be configured to track the patient as he makes his way through the various stations, records the time at each location, the elapsed time at each station, and record IDs of various caregivers wearing DWs and coming into contact with the WAD ID worn by the patient, to name a view separately implemental examples.

As shown, the system architecture 200 comprises a WAD 142 worn by an individual 202, such as a patient. As previously described, the WAD 142 can comprise a BLE (Bluetooth Low Energy) chip for advertising its identifier or ID, an infrared receiver IRRX, and optionally one or more buttons to start/stop an event at a specified zone. In the embodiment of FIG. 3, only three zones 212, 214, 216 are shown associated with the facility 198 but the number of zones are not limited and can comprise a larger number, such greater than 6 zones or 10 zones, for example, 40 zones, 60 zones, or 300 zones or more. The WAD 142, among a plurality of WADs, can be kept at a reception desk or other intake department at the facility 198, which can be a hospital, a restaurant, a business complex, etc. When a person comes in for care or for other services, a WAD can be assigned to the individual and an ID on the WAD associated with that individual. As the patient 202 moves about the facility 198, the system can track the patient or individual 202 by tracking the WAD 142 worn on the patient, as further discussed below.

The system architecture 200 further includes one or more Wifi/BLE-based gateway devices GWs 210, one for each zone of the facility 198. For example, a gateway 210 can be placed every 40 to 80 feet radius within the facility 198, which compartmentalizes the facility into zones. Each gateway 210 can instead be placed in a designated treatment unit, such as an X-ray room or an MRI room. The gateway 210 is configured to scan and detect advertising signals from one or more WADs 142, each with a unique ID, and then relay this information to the cloud server for processing these received signals/events, such as to track the time that a particular WAD arrives at a particular zone, how long the WAD is located in the particular zone, and interactions with other WAD IDs or DW IDs within the zones detected. An exemplary gateway GW 210 comprises a BLE chip, an IR transmitter, and a WiFi module to enable the gateway GW 210 to communicate with a remote server, such as to the Cloud 220.

When the individual 202 enters a zone 212 of the facility 198, the IR transmitter 196, either external to or built-in with the gateway 210, such as integrated into the same housing, can transmit an IR code to the IR receiver in the WAD 142. The BLE module in the WAD then wakes up and advertises its WAD ID, which can be called a patient ID when used in the context of a hospital, along with the IR code ID representing the location received by the IRRX, i.e., a Combination ID. The WAD then sends a BLE message containing the Combination ID that can be picked up by the BLE monitor module of the gateway in the same zone 212. The gateway 210 can then relay the detected Combination ID to the Cloud, and this event is time stamped by the Cloud server software.

The system architecture 200 further includes a remote server or a cloud server 220 that stores tracked data sent by the one or more gateways 210 in a cloud database and permits queries from personnel, administrators, and/or other authorized users of the stored data, such as the patient's family members. For example, a user who wants to check/monitor the location of a relative that wears a WAD can do so on a laptop, a PC, a display panel or a terminal, a Smartphone, a tablet, or other communication devices 230 that is capable of accessing the Cloud. Via a web browser, the user can log onto the Cloud 220, enters the patient's name, the patient's ID, the WAD IR, or combinations thereof and can see or query various information recorded about the patient, who is wearing a WAD 142 and the WAD is tracked by the system 200 of the present disclosure.

The system architecture 200 can optionally include one or more infrared transmitters 196a located along various hallways or corridors of the facility 198, such as a hospital or a corporate building. The IR transmitters located in the hallways or corridors, apart from the IRTX located in the various zones, can be referred to as Hallway IRTXs 196a. For example, the infrared transmitters Hallway-IRTXs 196a can be located just outside of the designated zones or designated treatment units such as a PACU (post-anesthesia care unit) and the OR operating room. The plurality of Hallway-IRTXs 196a can be powered by AC power outlets and can remain continuously powered to transmit a Hallway-IR code. When a patient exits a zone and enters a hallway or corridor where one of the Hallway-IRTXs 196a is located, the Hallway-IRTX 196a emits a Hallway-IR code that is received by the WAD's IRRX, which then causes the WAD's BLE module to emit an advertising beacon with a Combination ID comprising the WAD's ID and the Hallway IR code, The optional Hallway-IRTX transmitters 196a and the IRTX transmitters 196 in the rooms/zones, when compared with a system based solely on BLE RSSI and without any infrared module, helps the system 200 to more accurately determine when the patient or individual 202 has exited a particular zone. When the patient enters another zone or another corridor, the process repeats as described above for initiating a WAD to emit a beacon signal with a new Combination ID, which comprises a different room ID code or location ID.

Yet another optional component that is usable in a large zone or room is a BLE Mesh repeater 194 in FIG. 3. A BLE Mesh repeater is preferred where one Wifi/BLE mesh based gateway may not sufficiently cover. For example, in a PACU (post-anesthesia care unit) with 20 beds, the room length can be 25 m-30 m or longer, well beyond the 6 m-10 m range in which a WAD can be reliably and accurately detected by the BLE module in the gateway.

In the case of a large room or zone, additional Wifi/BLE gateways can be added at spaced locations in the zone to cover all possible detectable locations that one or more WADs can be positioned, located, or move about. However, adding or using BLE Mesh repeaters in a large room or zone application is more cost-effective than using multiple gateways for the same large room or zone. Further, each gateway is also Wifi enabled but it is not necessary to use Wifi to detect multiple WADs from the same large zone or room. A repeater does not have built-in Wifi module, which is not necessary for the present application. Instead, via BLE-Mesh network, these repeaters can detect the presence of nearby WADs and send back the Combination IDs from the respective WADs to the gateway. Each repeater, in communicating with the gateway, can optionally communicate via other repeaters in sending information to the gateway for the gateway to then relay the information to the cloud server. Similarly, in large zone or zone with separate entrances, one IRTX 196 line-of-sight range might not cover the entire zone's area, in which case more than one IRTX 196 may be placed at different locations within the zone or room. Note also that a IRTX 196 and a BLE module of a repeater can be combined into a single unit, as in the repeater 150 of FIG. 2, or can be separate.

Figure 4:
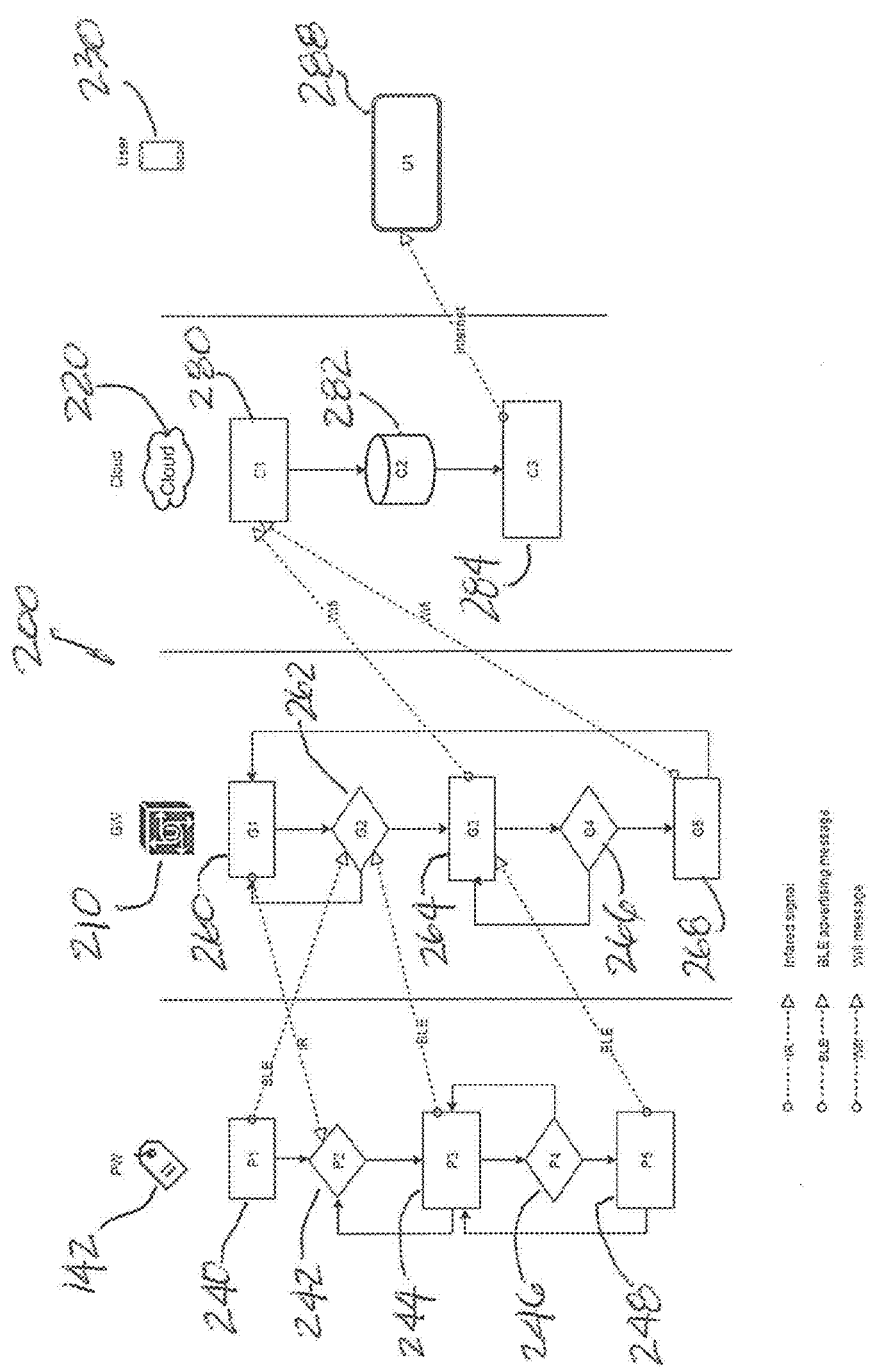
FIG. 4 is a process flow diagram showing different steps performed by different components of an exemplary tracking and monitoring system of the present disclosure.

Specific aspects of the system architecture 200 of FIG. 3, such as process flow diagrams of the various components, are further shown with reference to FIG. 4. Refer initially to the WAD 142 shown in the diagram, the device can embody a wearable advertising device that is about the size of a coin. However, a larger sized WAD and/or a different shaped WAD is contemplated, such as a rectangular shaped WAD, an elongated keyfob, etc. The WAD can have an outer housing having electronic circuits located therein. A removable door can be provided for loading and replacing a battery to drive the electronics inside the housing. The housing can include a surface or a pocket for holding other items, such as a name card or an ID card. Although the present WAD is specifically designated as a patient wearable PW advertising device, it is not so limited and can be used by other users or wearers and for applications other than hospitals.

FIG. 4 shows a data flow chart representing the system architecture 200 of FIG. 3, which can be considered a patient flow monitoring system at a hospital or for a hospital application. The data flow chart depicts process flow for a WAD 142, a gateway 210, a Cloud server 220, and a communication device 230 that is usable by an individual or person. The gateway 210 can be located in a zone to monitor patients arriving and exiting that zone. As discussed above, if a zone is large, the zone, in addition to the gateway 210, may include one or more BLE Mesh Repeaters 150 (FIG. 2), each with optional built-in IRTX, that run BLE Mesh networking software to extend the range coverage. Thus, the data flow chart of FIG. 4 can be viewed as optionally including one or more repeaters for each of the zones discussed and these repeaters then communicate with one gateway in each of the zone to then communicate with the Cloud server. These BLE Mesh repeaters running on a mesh network are described in co-pending application entitled A SMART HOME PLATFORM WITH DATA ANALYTICS FOR MONITORING AND RELATED METHODS, filed Feb. 16, 2016 by the same inventor and previously incorporated herein by reference.

The WAD 142 can include an IR receiver and a BLE module programmed to advertise a BLE Beacon with a Combination ID, and wherein the Combination ID can comprise a combination WAD ID and a Room ID or a WAD ID and a Hallway ID. When the WAD is in a room and the WAD's IRRX detects the room IR code, the WAD emits a beacon with a Combination ID consisting of the WAD ID and the Room ID. Right after WAD's power resets or when the WAD is in the hallway and the WAD's IRRX detects the Hallway IR code, the WAD emits a beacon with a Combination ID consisting of the WAD ID and the Hallway ID.

At block 240, when the WAD 142 is in the hallway or when it just comes out of reset mode, the advertised Combination ID emitted by the WAD 142 consists of the programmed WAD ID, unique for each WAD, and the Hallway ID. This is the default or idle mode of the WAD.

At block 242, the WAD 142 IRRX checks to see if it has received an IR signal from a gateway 210 IRTX. For example, the patient wearing the WAD 142 can enter a room or a zone and the IRTX 196 (FIG. 3) of the gateway 210 located in that room or zone transmits an IR signal containing the room or location ID to the IR receiver (IRRX) in the WAD 142. The IR receiver then activates the BLE advertising module.

At block 244, when a valid IR code is received from the IRTX 196, the BLE advertising packet in the WAD is updated with the received room or location ID code. The updated information with the WAD ID and the room ID, e.g., the Combination ID, can be advertised by the WAD to let the system know its whereabouts.

The WAD process returns to block 242 to check if the patient wearing the WAD 142 enters another room or another zone by verifying if the IR receiver on the WAD receives another IR from a different IR transmitter 196 or 196*a* (FIG. 3) at a different location having a different IR code. For example, the WAD can update its Combination ID to contain a Hallway-ID if the patient steps into a hallway and receives a Hallway-IR code from a hallway IR transmitter 196*a* (FIG. 3).

At block 246, a user or a practitioner can optionally press a button on the WAD 142 to indicate the start of an event to be monitored in that particular room or zone. The same or a different button on the WAD 142 can also be pressed a $2^{nd}$ time at block 248 to mark a stop event. For example, if a patient is in the operating room (OR), a nurse can press a button on the WAD 142 representing the start time of the surgery. A second button press will indicate the end of the surgical operation. These button press events can be relayed over BLE beacon messaging to the gateway 210 in the OR room and then to a Cloud server for time stamping and deriving the total surgery time, among other information or data analytics that can be programmed with the Cloud server.

The system 200 of FIG. 4 includes one or more gateways 210, as previously discussed with reference to FIG. 3. Each room or zone can have one gateway with one or more repeaters or two or more gateways spaced from one another, as previously discussed. The gateway 210 shown in FIG. 4 comprises a housing with circuits that can be powered by the facility AC outlet. The gateway 210 can contain a BLE module and an IR transmitter to transmit a zone, room or location ID via IR code at block 260. The gateway can be placed in a room or a zone with an assigned ID that can have a numeric code such as 3425199, an alpha code such as ABJSS, or an alpha numeric code such as 34XJ12. The room ID is encoded in the IR code and is transmitted by the IR transmitter in the gateway. When used in a different facility, this room ID can be linked to a different location, such as conference room on the $8^{th}$ floor, or a storage facility. For example, GW ID 22891 is linked to Conference Room 2 on the eight floor. Thus, the GW ID can be assigned to any zone, room or location, such as the OR.

At block 262, the gateway 210 monitors incoming Beacon signals, if any. If a WAD's BLE advertising packet is from block 240, with a Combination ID that includes a Hallway-ID, or from block 244, with a room or zone ID other than the Hallway-ID, is detected, then the process goes to block 264.

At block 264, if the WAD's BLE advertising packet, e.g., Combination ID, from block 244 with a room ID other than a Hallway ID is detected, then the received room ID is compared against the gateway's room ID for a match. When a match is confirmed, an InRoom condition is activated and relayed to the cloud server 220 for time stamping and logging. On the other hand, if the WAD's BLE advertising packet from block 240 with a Hallway ID is detected by the gateway's BLE module even when the WAD is in the room, this could mean that the IR line-of sight between the gateway and the WAD is blocked, thus BLE RSSI moving average algorithm should be used to compare against a threshold value to decide whether the WAD is in the InRoom condition or not. If the RSSI average is larger than the threshold value, then the InRoom condition is enabled and relayed to the Cloud server 220, else the InRoom condition remains disabled. When the InRoom condition is enabled, the gateway can alternatively monitor additional event signals from block 246, i.e., first button press or Start event, or block 248, i.e., second button press or Stop event, and then send the event signal (e.g., surgery at Operation Room number 3345 and start/stopped events) to the Cloud 220 for time stamping and logging.

At block 266, the gateway 210 checks to see if the InRoom condition still persists. If so, the gateway returns to block 264 for continuously checking and processing of the Start/Stop button press.

At block 268, when the InRoom condition is no longer true, the gateway 210 sends this event to the Cloud and loop back to block 260 for continuous processing.

With further reference to FIG. 4, the system 200 includes a Cloud server 220, as that term is understood by a person of ordinary skill in the art. The server 220 is configured, such as programmed, to receive messages from one or more gateways 210 of the system at block 264 or block 268. The Cloud server can comprise a database 282 for storing events, IDs, elapsed time, etc. and can receive updated information from one or more gateways 210 of the system 200. From time-stamped events data in the database at 282, block 284 creates a user interface (UI) dashboard that users can view via a web-browser 288 on their PC, laptop, smartphone, or electronic devices 230.

Besides tracking patient location and flow in a hospital environment, the present system 200 can also provide a similar RTLS service for hospital's caregivers (real time location system) to help reduce hospital-acquired infections ("HAIs") and to enforce a restaurant's kitchen/restroom hand-washing policies, to name a few examples. The present system 200 can detect the ID of a caregiver who enters and exits a patient's hospital room by tracking a WAD ID emitted by a WAD worn by the caregiver. For improved WAD's battery life and improved verification that a caregiver of a particular room or zone is the correct caregiver instead of a different caregiver from another adjacent room or zone, the WAD can be configured to only beacon the WAD Combination ID after the WAD's IRRX receives an IR code from the room's repeater.

The system can check whether a caregiver remembers to wash his hands with soap or a hand sanitizer from the room's signal capable dispenser. This is determined by monitoring if the signal capable dispenser has dispensed from the bottle within a few seconds of the caregiver's arrival and departure from the patient's room. The system can remind the caregiver to wash his hands with soap or hand sanitizer if he forgets to do so as well as logging these activities with time stamps in the cloud database.

Figure 5:
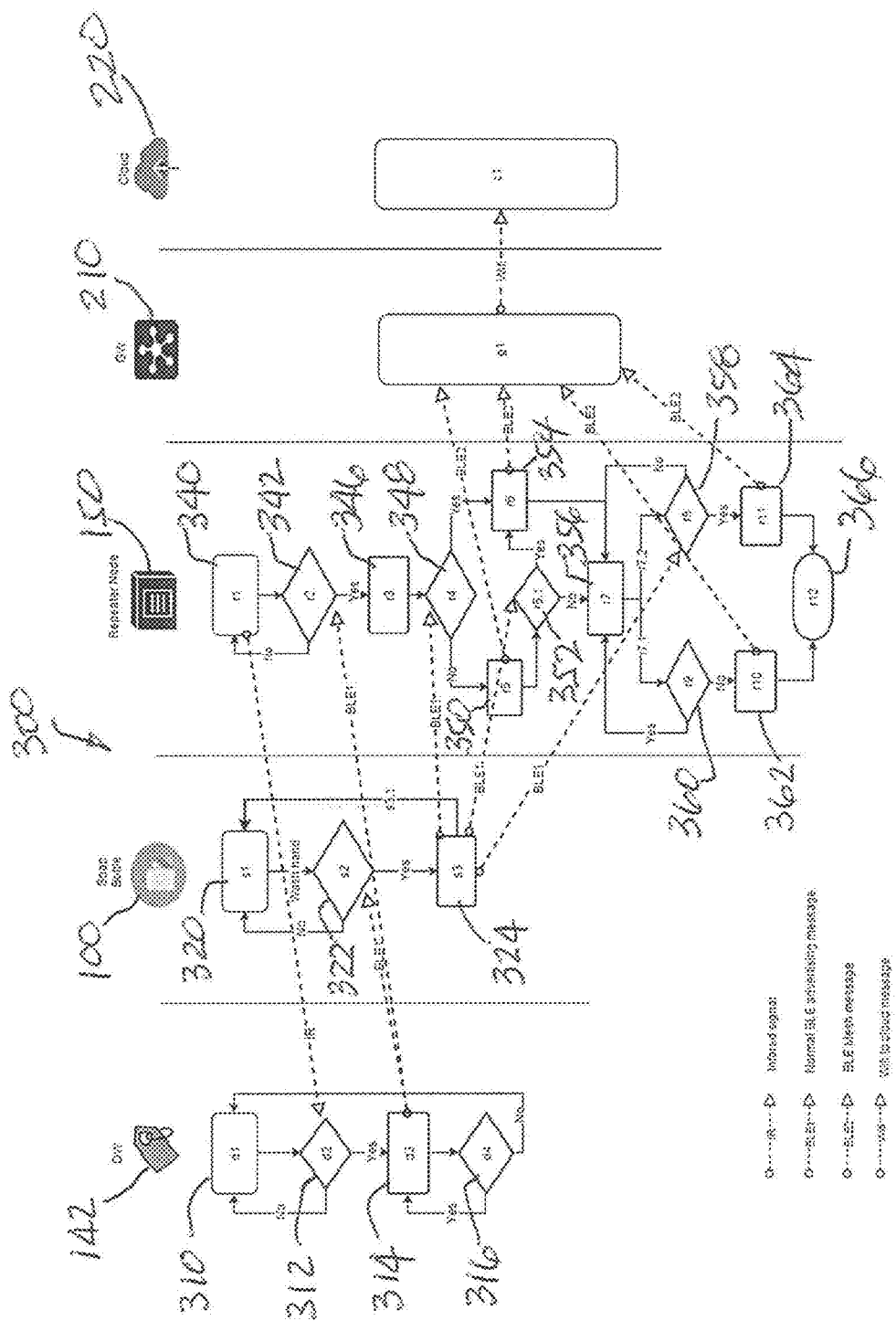
FIG. 5 is a process flow diagram showing different steps performed by different components of an exemplary tracking and monitoring of an alternative system of the present disclosure.

With reference now to FIG. 5, a schematic diagram depicting a system architect 300 that can track one or more dispensers and WADs worn by individuals, such as caregivers, is shown. The system comprises one or more WADs 142, one or more signal capable dispensers 100, one or more repeaters 150 per room or zone, one or more gateways 210 with one per ten (10) adjacent rooms for example, and a Cloud server 220. Optional IRTX can be placed in the hallway to more quickly detect when the individual wearing the WAD has left the room. The system 300 can be implemented in a hospital environment, in an office building, in a restaurant, in a manufacturing plant, etc. Workers, guests, patients, or other users can be assigned a WAD 142, each of which having a unique WAD ID that can match up with the name or ID of the individual wearing the WAD. The facility can have signal capable dispensers 100 in any number of rooms or zones, such as a waiting room, a reception area, a restroom, a conference room, etc.

A room or zone where a signal capable dispenser is located can also include a repeater 150 with built-in IRTX transmitter. For every two to ten repeaters or more, a gateway 210 can be centrally or commonly positioned to pick up signals from the repeaters via BLE Mesh networking protocol. Information gathered by the multiple gateways 210 can be sent to the Cloud serer 220, each gateway handling a group of adjacent rooms, for example in a wing of a hospital floor. Optionally, "Hallway IRTX" IR transmitters can be located in hallways or along sections or corridors to turn off the WAD's advertising Beacon, for example, when the wearer of the WAD, such as a caregiver, leaves a room. This helps save battery consumption in the WAD and also helps the system's repeater to correctly re-detect the WAD in the case the caregiver immediately re-enters the room after exiting it. This can be used to request or require another hand-washing cycle upon re-entry of the room.

Note that a Hallway IRTX 196a in the system 300 of FIG. 5 is configured to turn off the WAD's BLE Beacon instead of causing the WAD to Beacon the "Hallway ID" message as in the system 200 of FIG. 2. Whether the hallway IR transmitter 196a turns off a WAD or initiates the WAD to beacon can be selected depending on the different system requirements, such as between the system 200 of FIG. 3 versus the system 300 of FIG. 5. The different applications can be implemented depending on battery life optimization and WAD proximity detection based on using IR with BLE RSSI or with just IR.

For the system 200 of FIG. 3, the WAD for wearing by a patient, as an example, is disposable or recyclable so battery life optimization is not important. For example, a new WAD can be issued each time to a new patient or the recycled WAD can be updated with new a new battery so battery conservation is not an issue. In contrast, a caregiver is assigned a permanent WAD in the system 300 of FIG. 5 so it is desirable to turn off the BLE Beacon module on the WAD when it is not needed to minimize battery power consumption.

The second scenario in choosing different ways to implement the IR transmitters is in the way the WAD is worn by the wearer. For the system 200 of FIG. 3, the patient might be under a sheet or a blanket and the IRRX on the WAD worn by the patient may be obstructed and not receive the IRTX signal due to this obstacle in its line-of-sight. Thus, for the system 200 of FIG. 3, it is necessary for the patient-wearable WAD to continue to beacon the Hallway ID as a default, which will allow the gateway of the system 200 of FIG. 3 to use BLE RSSI to detect the arrival of the WAD even when the line-of-sight between the WAD's IRRX and the IRTX is blocked.

The WAD in the system 300 of FIG. 5, which can be worn by a caregiver, does not have the problem of a sheet/blanket blocking the IR light path so the BLE module in the Doctor-wearable WAD can be turned off when being near a Hallway IRTX. In an alternative embodiment, the WAD's BLE module can be left ON and the BLE RSSI can be used in conjunction with the IR signaling, but at the expense of battery life of the WAD.

As previously described with reference to FIGS. 2-4, a WAD 142 usable in the present system 300 comprises a wearable advertising device (WAD) that can be worn as a badge or can be coupled to a typical identification card or badge. The WAD 142 has a BLE (Bluetooth Low Energy) module and an Infrared receiver. The BLE module is programmed with a unique ID that can be matched to the name or ID of the person wearing the device, such as to a particular nurse or doctor. For example, WAD ID 23458411 is assigned to Dr. J. Smith.

A signal capable dispenser 100, as previously discussed, can be a soap bottle or a dispenser with a switch and a BLE module to detect when the dispenser is activated to dispense some of its contents, as discussed above with reference to FIGS. 1A and 1B. When activated, the hand-washing event by the wearer of the WAD 142 will be recorded. In an example, a BLE module of the dispenser 100 sends a signal of the ID of the dispenser as well as the WAD ID that activated the soap dispenser, e.g., a Dispenser Combination ID, to a BLE Mesh repeater, if used, otherwise to a Wifi/BLE Mesh gateway to then forward the captured signal to a Cloud server, as previously discussed and as further discussed below. In an example, the Dispenser Combination can comprise not only the WAD ID, the dispenser ID, but also the location ID of where the dispenser is located.

A repeater or repeater node 150 of the present disclosure is a BLE module in a mesh network for monitoring the WAD wearers' hand-washing events, as reported by the one or more soap bottles 100 and the one or more WADs, which report WAD IDs so that the system can discern one wearer from another wearer. A typical repeater 150 can embody a housing with electronics having both a BLE module and an Infrared transmitter. The repeater 150 can be located in a room or a zone and can be powered by AC power outlet.

A gateway 210 of the present disclosure incorporates a BLE module for monitoring Combination IDs of hand-washing events relayed by one or more repeaters 150 and has WiFi capabilities for communicating the received information to a Cloud server 220 for time-stamping and data logging and generating hand-hygiene compliance reports, among others. The gateway 210 also runs a BLE-Mesh networking protocol firmware similar to the one in the repeaters.

With reference again to FIG. 5, a process flow for a wearable advertising device WAD 142 will now be discussed. At block 310, the BLE chip or module located in the housing of the WAD is normally in the default sleep mode (e.g., non-beaconing). The BLE chip remains in this non-Beaconing mode until the IR receiver located in the WAD detects an IR code from a repeater 150 with built-in IR transmitter in a designated room, zone, or location. Upon detecting the IR code from the IRTX, the BLE module in the WAD is energized to begin Beaconing.

At block 312, the IR receiver in the WAD detects an IR signal containing a room or location identifier from a repeater 150. For example, a doctor wearing a WAD 142 enters a patient's room and the WAD is awakened by the transmitted Room or location ID from the IRTX of the repeater 150.

At block 314, the BLE chip wakes up from its default sleep mode to process the room ID received at block 312 and to advertise a BLE packet containing this room or location ID together with the ID of the WAD.

At block 316, if the IR code from the repeater 150 is no longer detected by the WAD for some programmable timeout period, such as 10 minutes to about 45 minutes or if the WAD receives a hallway IR code to turn off, such as when a doctor leaves the room and moves into the hallway, then the BLE advertising in the WAD 142 is turned off and the process goes back to block 310.

With reference to the flow chart for the signal capable dispenser 100, the dispenser 100 is in an idle state at block 320. The BLE module mounted to the dispenser 100 is in sleep mode and is waiting to wake up by a mechanical switch or the activation mechanism of the dispenser, which then activates the BLE module when the bottle's soap-release-mechanism starts to dispense the soap, as previously discussed with reference to FIGS. 1A and 1B. The BLE module can work with both existing mechanical and optical soap bottle activators.

When a caregiver or other WAD wearer activates the signal capable dispenser 100 at block 322, the dispensing event wakes up the BLE module. The BLE module mounted with the dispenser 100 is programmed to discover the BLE advertising packet emitted by the WAD 142 from block 314. If a BLE advertising packet is found, the process moves to block 324, else goes back to block 320.

At block 320, the BLE module on the dispenser 100 advertises the washing BLE packet (which includes the soap bottle's ID and the WAD's user ID that is found during scanning, and can be referred to as a Dispenser Combination ID), and is picked up by the BLE module on the repeater 150, as further discussed below. Optionally, as each repeater's room ID is paired with a corresponding bottle in that same room as the repeater, the bottle ID and the room ID can be programmed to have the same unique ID.

After the dispenser 100 advertises its washing BLE packet containing a Dispenser Combination ID, it waits until a timeout period, stops advertising, and then goes back to block 320. In some example, the dispenser 100 times out after a few seconds, such as 5 to 15 seconds, after sending out its washing BLE packet. The amount of time before timeout can be selected and programmed as desired.

With reference to the flow chart for the BLE Mesh repeater 150 shown in FIG. 5, its process flow will now be discussed. The repeater node 150 in block 340 normally continuously transmits an IR code that is programmed to contain a specific ID, which can correlate to a location or a room and can be called a room ID. Concurrently, the BLE module incorporated with the repeater 150 is active and scans for advertising Beacon signals, such as from a WAD 142 from block 314 and from a soap dispenser 100 from block 324.

At block 342, the repeater 150 checks to see if it receives a BLE-advertising packet from a WAD with a matching room ID of the repeater 150. If the matching room ID is received by the repeater 150, along with the WAD ID, the process moves on to block 346 otherwise it returns to block 340. At this point, the system 300 can interpret from the detection that a wearer of a WAD is in a particular room with the room ID. At block 346, the repeater 150 monitors for a BLE packet from the signal capable dispenser 100. If the BLE packet is received, it will indicate that the dispenser 100 has been activated.

At block 348, the dispenser's BLE washing packet is detected and includes a bottle ID. The bottle ID can be a numeric code, an alpha code, or an alpha numeric code that can be correlated to a dispenser at a particular room or location. If the bottle ID is detected and is as expected (e.g., the bottle is in the same room as the repeater), the process goes to block 354. If the bottle ID is not received, or is received but does not have the expected ID, the process moves to block 350 to wait for a hand-washing event during a short timeout, for example a 5-30 second timeout.

At block 350, where the bottle ID has not been received correctly by the repeater 150, which is interpreted to mean that the wearer, such as the doctor or nurse has not washed his or her hands, the repeater 150 then sends a signal representing an alert or reminder to the doctor about washing his hands by activating the signal capable dispenser 100. The warning or reminder message can be transmitted by a special BLE message or IR code to the WAD 142 to, for example, vibrate the WAD or blink an LED on WAD. Optionally, a buzzer located in the repeater node 150 in the room is activated to serve as a reminder or a warning. The repeater can also send information about the reminder to wash to the gateway and the gateway, in turn, relays the information to the cloud server for logging and reporting.

After the reminder message is sent, the system moves to block 352 and waits a few seconds for the doctor to wash his hands. The wait time can be programmed into the repeater node 150 and can vary, such as from 5 seconds to 30 seconds. If the Doctor washes his hands within this time period, the process moves to block 354, else to block 356 in which case the cloud server would mark this as a failure to wash hand upon entry despite being reminded to do so.

At block 354, activation of the signal capable dispenser 100 is interpreted as the doctor having washed his hands. A report is then sent by the repeater node 150 to the gateway 210 via a mesh protocol to denote compliance, and the process flows to the next block 356

At block 356, the repeater 150 has finished processing and has reported the hand-washing activity following entry into the room. Now, the repeater monitors the WAD to determine a second hand washing activity upon the doctor, and hence the WAD, exiting the room. If the WAD's BLE packet from block 314 is still detected for a few seconds, such as 5 to 20 seconds, the process proceeds to block 360 which will loop back immediately to block 356 as the caregiver is still detected to be in the room. If a BLE packet from a hand-washing event is detected from block 324, which means the caregiver has activated the soap dispenser a second time to prepare for his exit, the process goes to block 358, which should flow immediately to block 364 to mark a second hand-wash event having been detected before exiting.

At block 358, the repeater 150 monitors for another hand-washing event, such as the doctor's second hand washing event before exiting the room. If a second hand-washing event is detected via a second hand washing BLE packet, then the process moves to block 364. If a second hand washing event is not detected, the process goes back to monitoring at block 356.

At block 360, the system monitors to see if the Doctor is still in the room by looking at the BLE signal from the WAD 142. If the doctor is still in the room, the process goes back to block 356 and monitors. If the doctor has left the room without the repeater detecting a second hand-washing BLE packet, the process goes to block 362 and reports a non-washing event. The report can be by way of a BLE packet via a mesh protocol sent by the repeater 150 to the gateway 210. The process then proceeds to block 366.

If the doctor washes his hands before leaving the room by activating the signal capable dispenser 100, a BLE packet is sent by the dispenser providing a Dispenser Combination ID and the repeater sends a handwash-upon-exit event at block 364 to the gateway 210 via a mesh protocol. The process then moves to block 366.

At block 366, the repeater 150 cleans up all states of the firmware and electronics as the doctor has left the room and then returns to block 340.

With reference to the flow chart for the gateway 210 shown in FIG. 5, its process flow will now be discussed. The gateway 210 in the present system can be considered a device that process messages from all repeaters in a one-way flow via BLE Mesh protocol. The gateway 210 of the present system is programmed to receive mesh messages from one or more repeaters. The mesh messages can include hand-washed code or hand-not-washed code in combination with DoctorID and roomID. Optionally, bottleID can also be included with the hand-washed code when the signal capable dispenser 100 is activated. The mesh message can also include a doctor's arrival and exit events. The mesh messages can come from any repeater nodes in the system. Information in the mesh messages are then sent by the gateway 210 to Cloud server 220 via WiFi.

With reference again to the flow chart for the Cloud server 220 shown in FIG. 5, its process flow will now be discussed. The Cloud server 220 comprises a Database for saving data received from one or more gateways 210. The Cloud server 220 can include a web browser dashboard and data analysis.

As an example, the Cloud server 220 can be used to monitor real time location of where all the patients assigned with WADs are at each department in the hospital. For other applications, workers, staff, and employees can be monitored for their whereabouts using the present system. The present system can also be used to track a production line by assigning a component or product with a WAD and then tracking the component or product via the BLE beacon signal emitted by the WAD as it moves through the assembly line. As another example, the present system can be used to track valuable equipment or tools as the equipment or tools make their way through a facility. For example, a WAD can be placed on or attached to an equipment or a tool and provide a similar tracking function as if worn by a wearer. Regarding application at a hospital, patients' waiting times at different queues or zones can be measured and department performance efficiency can be estimated. The gathered data can also be used to optimize staffing needs.

Similar to a FedEx tracking system, the patient's real time location information can be shared over the Internet on a web browser for remote family members to follow and track at which department in the hospital the particular patient is currently located. Additionally, in the OR (operating room), the step of pressing a button on the patient's WAD at the beginning and at the end of the surgery can be recorded in the Cloud to measure surgery time of the patient assigned to that particular WAD.

Similarly, instead of tagging a patient with an advertising Beacon device, hospital staff or even assets can be tagged with Beacon devices. This enables real-time staff workflow management, and asset tracking services at the hospital.

Hand hygiene compliance at restaurants in particular and other business establishments can also benefit from the use of tracking and monitoring features of the present disclosure, such as the soap dispenser described elsewhere herein.

Figure 6:
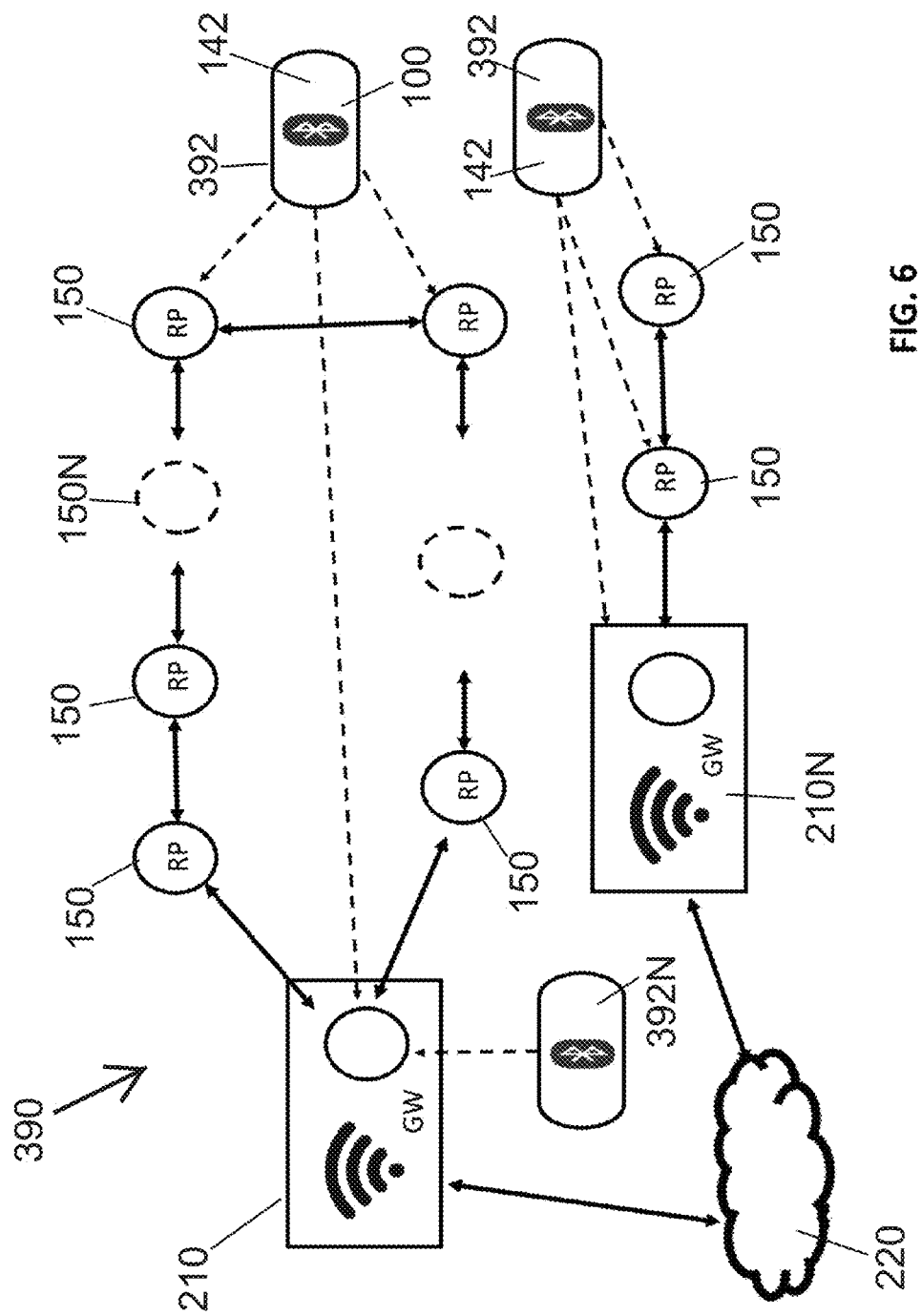
FIG. 6 is a BLE-Mesh network depicting how various components of a tracking and monitoring system interact within the mesh network.

FIG. 6 shows a BLE-Mesh network 390 consisting of a number of BLE Mesh repeaters 150 employed for tracking and monitoring one or more WADs 142 and/or signal capable bottles 100 in accordance with aspects of the present disclosure. For discussion purposes, a WAD and a signal capable bottle can be referred to as a BLE beacon device 392, or BBD. These BBDs are end nodes in the BLE network so they do not need to run any Mesh protocol. In a mesh network, each repeater, called a node, is required to relay messages not meant for it to the next repeater in the network.

Generally speaking, when BBDs communicate over regular (non-Mesh) BLE messaging, these BBDs consume minimal power and thus can be battery operated. The BLE-Mesh network allows various BBDs 142, BLE Mesh repeaters 150, and Wifi/BLE Mesh-based gateways 210 (also called Wifi-BLE bridges as they bridge BLE advertising devices and sensors and the Cloud by converting BLE signals to Wifi for uploading to the Cloud) to interconnect. This allows for signals and/or commands to transfer from a sending node to a target node either directly or indirectly by hopping through other nodes, achieving a much larger range than the typical BLE range of 20-30 m. Thus, the present mesh network is not a typical star topology wherein a central hub, such as a switch or a router, is required. The present system allows a BLE beacon signal from a BBD 142 to be detected by a BLE Mesh repeater 150 or by a gateway 210. If the information is first received by a BLE Mesh repeater, it then relays the information to a gateway, which then forwards the information to a Cloud server 220. If the information is received by a gateway directly, the gateway then forwards the information to the Cloud server. Note that the gateway has both Wifi and BLE modules and can act as a bridge between the BLE devices on the repeater's Mesh network side and the Cloud side through Wifi. In addition to communication through the network of BLE Mesh repeaters, the present system also supports direct BLE messages between BLE modules in a WAD and in a dispenser, which do not run Mesh protocol.

The mesh network 390 of the present disclosure can be built by associating all RP repeater nodes 150 relative to one another together with the gateway's BLE Mesh module. In an example, a smartphone (with BLE 4.0 enabled) device with an app can be used to associate all RP nodes 150 (e.g., assign IDs) and one Gateway's BLE node into a mesh network by manually entering a specific device ID for each of these nodes, and a common Mesh Network ID for all of them. In this way, all these nodes now have distinct ID's and they form a network identified by a specific Mesh network ID. During the association step of each RP node, the RP node must be given the node ID of the gateway's BLE module node. In this way, when a WAD message is relayed from one RP to the gateway, the RP node can directly specify the gateway's BLE node ID as a destination target node. This method is superior than the popular broadcast method which broadcast this WAD message to all nodes in the network which can cause traffic congestion and delay. After association, each node in the mesh network 390 has a unique Mesh Node ID that it is associated with and can be uniquely identified.

For those specifically specified as gateways 210, they can act as a bridge between a Cloud server 220 and the local BLE-Mesh network 390. The one or more gateways 210 receive events and/or messages from the repeater nodes 150 in their same Mesh Network ID within the network 390 and post them on the Cloud server 220. Although the gateways 210 can be configured to direct BLE signals in only one direction, such as to relay collected data the Cloud server 220, the gateways and repeaters can be programmed to receive instructions across the Internet and act on that information. For example, messages from the Internet targeted for a particular repeater 150, singled out for its specific identifier, in the BLE-Mesh network 390 can be transferred to gateway 210 and then that gateway to the particular repeater 150. Using Mesh protocol, the particular repeater's ID can be resolved. For example, these bidirectional messages can carry commands to emit an alert or an alarm.

With reference again to FIG. 6, via the BLE association step described above, the number of repeaters 150 within one Mesh network ID can be added to the MESH network to extend the range of the network, represented by repeaters 150N. Similarly, the number of BBDs 392 and the number of gateways 210 can be added, shown as 392N and 210N, respectively. But these additions are done differently: for the BBDs, as they are non-Mesh devices, they must be added not via association, but rather via customized firmware in the RP to allow scanning for these specific new BBDs. To add new gateway 210N, for example to support a new group of adjacent hospital patient rooms, a new association process needs to be rerun as described earlier to assign ID's to each RP node and also the gateway's BLE node, and to assign all of them in a common Mesh Network ID.

Method of using, assembling, programming, and manufacturing the components and systems of the present disclosure are understood to be within the scope of the present invention.

Although limited embodiments of tracking and monitoring systems and their components have been specifically described and illustrated herein, many modifications and variations will be apparent to those skilled in the art. For example, the various systems can find applications in other facilities and businesses than those expressly provided, etc. Furthermore, it is understood and contemplated that features specifically discussed for one system or embodiment may be adopted for inclusion with another system or embodiment, provided the functions are compatible. Accordingly, it is to be understood that the monitoring and tracking systems and their components constructed according to principles of the disclosed devices, systems, and methods may be embodied other than as specifically described herein. The disclosure is also defined in the following claims.

What is claimed is:

1. A tracking and monitoring system comprising:
   a wearable advertising device (WAD) comprising a housing having a BLE module and an IR receiver; said BLE module of said WAD having a unique WAD ID;
   a gateway having a BLE module and a WiFi module in an enclosure, said gateway is configured to receive said WAD ID over a BLE-Mesh network of repeaters and forwarding said WAD ID using said WiFi module to a remote server;
   a button on said WAD configured for time-stamping a first event when the button is pressed, said first event with the time-stamping is configured to be received by the BLE module of the gateway and reported to the remote server over WiFi; and
   the button is configured for time-stamping a second event when the button is pressed a second time, which is used with the first event to compute an elapsed time.

2. The tracking and monitoring system of claim 1, further comprising a signal capable dispenser having a BLE module, and wherein the BLE module on the signal capable dispenser is active only following activating a dispensing mechanism associated with said signal capable dispenser.

3. The tracking and monitoring system of claim 1, further comprising a repeater, said repeater comprising a BLE module for receiving said WAD ID from said WAD and forwarding said WAD ID to said gateway for sending to the remote server.

4. The tracking and monitoring system of claim 2, wherein said signal capable dispenser is a soap dispenser or a hand sanitizer dispenser having a mechanical hand pump actuator or an optical sensor for activating an actuator.

5. The tracking and monitoring system of claim 3, further comprising an IR transmitter associated with said repeater, said IR transmitter programmed to send an IR ID to said IR receiver in said WAD.

6. The tracking and monitoring system of claim 5, wherein said WAD ID is only transmitted after said IR receiver of said WAD receives a signal from said IR transmitter of said repeater.

7. The tracking and monitoring system of claim 1, further comprising an IR transmitter remote from the gateway, wherein said IR transmitter is configured to put said BLE module on said WAD on sleep mode.

8. The tracking and monitoring system of claim 1, wherein the gateway is programmed with a BLE-mesh networking software and wherein return signal strength indicator (RSSI) comprising moving-average is used to detect proximity and identity of the WAD and a repeater that runs a BLE-Mesh networking software.

9. The tracking and monitoring system of claim 1, wherein the gateway is a first gateway and further comprising a second gateway, wherein said second gateway comprises a BLE module and an IR module and wherein said IR module of said second gateway is configured to relay a second gateway IR ID to said WAD to wake up the BLE module of said WAD.

10. The tracking and monitoring system of claim 9, wherein said WAD is configured to emit said WAD ID and said second gateway IR ID to said second gateway for sending to the remote server.

11. The tracking and monitoring system of claim 2, wherein a number of times the dispensing mechanism has been activated over a time interval is communicated to the remote server.

12. The tracking and monitoring system of claim 1, comprising a beacon signal comprising a dispenser combination ID comprising the unique WAD ID and a unique ID associated with a dispenser.

\* \* \* \* \*

UNITED STATES PATENT AND TRADEMARK OFFICE
CERTIFICATE OF CORRECTION

PATENT NO. : 9,980,082 B2
APPLICATION NO. : 15/045104
DATED : May 22, 2018
INVENTOR(S) : Hoang Nhu Page 1 of 1

It is certified that error appears in the above-identified patent and that said Letters Patent is hereby corrected as shown below:

On the Title Page

Item [*], Line 3, after "0 days." delete "days.".

In the Specification

Column 2, Line 41, after "hospitals" insert -- . --.

Column 14, Line 28, delete "code," and insert -- code. --, therefor.

Column 21, Line 20, after "356" insert -- . --.

In the Claims

Column 25, Line 22, in Claim 12, after "1," insert -- further --, therefor.

Signed and Sealed this
Twenty-sixth Day of March, 2019

Andrei Iancu
*Director of the United States Patent and Trademark Office*